United States Patent
Ansorge et al.

(10) Patent No.: US 7,590,131 B2
(45) Date of Patent: Sep. 15, 2009

(54) TRANSPORT NETWORK RESTORATION METHOD

(75) Inventors: Stefan Ansorge, Ohmden (DE); Martin Huck, Möglingen (DE); Dieter Beller, Korntal (DE)

(73) Assignee: Alcatel, Paris (FR)

( * ) Notice: Subject to any disclaimer, the term of this patent is extended or adjusted under 35 U.S.C. 154(b) by 902 days.

(21) Appl. No.: 10/787,358

(22) Filed: Feb. 27, 2004

(65) Prior Publication Data
US 2004/0190446 A1 Sep. 30, 2004

(30) Foreign Application Priority Data
Mar. 28, 2003 (EP) .................... 03290787

(51) Int. Cl.
H04L 12/28 (2006.01)
H04L 12/56 (2006.01)
(52) U.S. Cl. ..................................... 370/409
(58) Field of Classification Search ............... 370/217, 370/225, 409, 422
See application file for complete search history.

(56) References Cited

U.S. PATENT DOCUMENTS

| 6,215,763 B1 | 4/2001 | Doshi et al. | |
| 6,331,978 B1* | 12/2001 | Ravikanth et al. | 370/392 |
| 7,167,443 B1* | 1/2007 | Dantu et al. | 370/218 |
| 2002/0172150 A1* | 11/2002 | Kano | 370/216 |
| 2002/0176370 A1* | 11/2002 | Ohba et al. | 370/252 |
| 2004/0022279 A1* | 2/2004 | Kailbach et al. | 370/542 |
| 2004/0105383 A1* | 6/2004 | Agrawal et al. | 370/228 |

FOREIGN PATENT DOCUMENTS

EP 1 134 922 A2 9/2001

OTHER PUBLICATIONS

"STS-1 Sonet Grooming Using Kichips KiSS VXE and ClassAct MPP" Kichips, WhitePaper, 'Online! Oct. 2002, XP002260856.
Anderson J et al: "Fast Restoration of ATM Networks" IEEE Journal on Selected Areas in Communications, IEEE Inc. New York, US, vol. 12, No. 1, 1994, pp. 128-138, XP000493894.
"Interface for the optical transport network (OTN)" ITU-T Recommendation G.709, XX, XX, Feb. 2001, pp. 1-80, XP002195641.
Papadimitriou D et al: Analysis of Generalized MPLS-Based Recovery Mechanisms (including protection and restoration), Internet Draft, Internet Engineering Task Force (IETF), Nov. 7, 2002, XP002234808.
G. Li et al: "RSVP-TE Extension for Shared-Mesh Restoration in Transport Networks", pp. 1-18, Nov. 2001.

* cited by examiner

*Primary Examiner*—Kevin C Harper
(74) *Attorney, Agent, or Firm*—Sughrue Mion, PLLC

(57) ABSTRACT

Transmission signals in a transport network are multiplexed from traffic streams respectively representing paths. Each path is identified with a path tag and forwarding information is provided in each network element. Failed paths in the network are restored in that the source network element cross-connects the affected traffic stream to an alternate output port and subsequent network elements receiving this unexpected traffic stream at an input port check the received path tag, determine an appropriate output port based on the tag and the forwarding information, and establish an internal cross-connection between the input port and corresponding output port.

24 Claims, 3 Drawing Sheets

TRANSPORT NETWORK RESTORATION METHOD

The invention is based on a priority application EP 03290787.5 which is hereby incorporated by reference.

FIELD OF THE INVENTION

The present invention relates to the field of telecommunications and more particularly to a path restoration method in a transport network and a network element with fast restoration capabilities.

BACKGROUND OF THE INVENTION

Transport networks serve for the physical layer transport of high bitrate tributary signals. In particular, the signals transmitted over a transport network are encoded and multiplexed into a continuous bit stream structured into frames of the same length. Within this constant bitrate bit stream, the frames are repeated periodically with a frame repetition rate of typically 8 kHz and are structured according to a multiplexing hierarchy. An example of such a multiplexing hierarchy is SDH (Synchronous Digital Hierarchy, see ITU-T G.707 10/2000) where the frames are termed synchronous transport modules of size N (STM-N, where N=1, 4, 16, 64, or 256). The frames have a section overhead and contain at least one higher order multiplexing unit called virtual container VC-4. A VC-4 can either directly carry a tributary signal or a number of lower order multiplexing units like VC-12 or VC-3, which then carry tributary signals.

Virtual containers are transmitted from source to sink through an SDH network and therefore represent a "logical" path through the network. The sequence of identical VCs having the some relative position in subsequent frames forms a traffic stream along that path. Each VC contains a path overhead (POH) and a payload section referred to as container (C). The US equivalent of SDH is known as SONET (Synchronous Optical Network). Another well known transport network with similar multiplexing units is the recently defined Optical Transport Network OTN; see ITU-T G.709, 02/2001.

A very basic aspect in all types of transport networks is availability and reliability of service. In other words, a transport network must be very robust against any kind of failure and the average outage time must be very low. Hence, a transport network needs to provide the means and facilities to ensure sufficient availability. Typically, network mechanisms which ensure this availability are distinguished in protection and restoration. The common principle of both is to redirect traffic of a failed physical link or logical path over a spare resource.

Protection is a mechanisms where an already established protection path or link is assigned to one selected high-priority path or link (known as 1+1 or 1:1 protection, depending on whether there is low priority extra traffic on the protection resource or not) or a group of n such selected paths or links (known as 1:n protection). In the case of a failure, traffic can be re-routed very fast over the previously established protection resource under the sole control of the affected network elements in typically less than 50 ms. However; this requires a protocol between the affected nodes to signal and synchronize switch-over. Protection is a high-quality service restricted to few selected premium connections, which are typically charged at a higher price. Moreover, protection requires a high amount of spare resources compared with the amount of protected resources, i.e., 100% of spare capacity in the case of 1+1 protection.

Restoration refers to a mechanism, where the network searches for restoration capacity and establishes a restoration path only after service path failure. Rather than calculating the restoration path after failure, pre-calculated restoration routes can be used instead but with the actual cross-connection to establish the path performed after failure. Restoration mechanisms are more stringent in the usage of spare capacity and however, providing a masking of the failure at a lower speed, typically in the range of a few seconds as completely new paths through the network must be established.

In label switched packet networks, as opposed to transport networks, alternative label switched paths (LSPs) can already be implemented and then used in the case of a failure. The fundamental difference between transport networks and packet networks, where MPLS applies (Multi-Protocol Label Switching), is that in packet networks statistical multiplexing is used allowing over-subscription of links and that an LSP can be established without using any bandwidth. However, in transport networks, if a path is established, then by definition the full bandwidth requested by the path is consumed, independent of whether traffic is transmitted over this path or not. An LSP can be established before failure in MPLS, but not used until after failure, whereas this is not possible in transport networks.

The IETF proposal "RSVP-TE Extension for Shared-Mesh Restoration in Transport Networks" by G. Li et al, draft-li-shared-mesh-restoration-01.txt, addresses this issue and proposes an GMPLS extension where backup paths are pre-established in the management plane of the network but only activated after detection of a failure. This requires signaling messages to be exchanged in the management plane, which in a GMPLS controlled network is distributed across the entire network. This interaction of a decentralized network management is, however, a relatively slow process, which leads to restoration times in the range of at least some hundred milliseconds.

SUMMARY OF THE INVENTION

It is an object of the present invention, to provide an improved restoration technique which allows faster restoration in a transport network than known restoration methods but offers more flexibility and requires less spare resources than known protection methods.

These and other objects that appear below are achieved by a method according to claim 1 and a network element according to claim 6.

In particular, the method according to the invention involves that each path is identified at least locally with an identifier called herein a path tag which is part of the multiplex units that represent the corresponding path and forwarding information is provided in each network element. In the case of a path failure, the source network element cross-connects the affected traffic stream to an alternate output port. When a network element receives a new traffic stream at an input port, it checks the received path tag and determines an appropriate output port based on the tag and the forwarding information and establishes an internal cross-connection between the input port and corresponding output port. The forwarding information is provided by the management plane of the transport network and represents pre-calculated restoration paths.

The established restoration path consumes spare resources in the network, which are therefore no longer available for restoration purpose in the case of further failures. Therefore, in an advantageous improvement, the management plane is informed of the established restoration path after activation of the restoration path in the event of a failure, and determines new forwarding information to allow masking of potential further failures in the network over newly pre-calculated restoration paths.

The invention has the advantage that the average restoration time in the network can be reduced to about 50 ms or even less, depending on the repetition rate of the tag and the number of involved network elements along the restoration path.

BRIEF DESCRIPTION OF DRAWINGS

Preferred embodiments of the present invention will now be described with reference to the accompanying drawings in which.

DETAILED DESCRIPTION OF THE INVENTION

In this specification, we use the term transmission signal for a multiplex signal subdivided into frames of the same length. The frames are structured according to a multiplex hierarchy into multiplex units such as virtual containers VC in SDH. A certain multiplex unit represents a path through the network and repeats every frame. The sequence of identical multiplex units that are transmitted along the same path form a traffic stream which transports a tributary signal. Several traffic streams are thus multiplexed according to the multiplex hierarchy to form the transmission signal.

Figure 1:
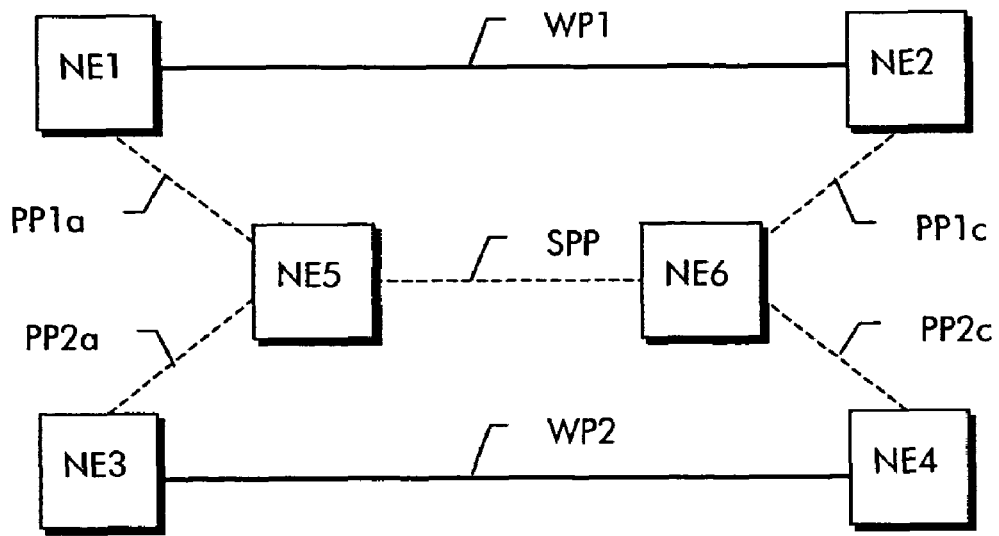
FIG. 1 shows an example network topology.

An example network topology is shown in FIG. 1. A first working path WP1 exists between network elements NE1 and NE2 and a second working path WP2 exists between network elements NE3 and NE4. Broken lines PP1a, PP1c, PP2a, PP2c, and SPP indicate reserved restoration capacity allowing network restoration in the case of a failure of either of the working paths. If for example path WP1 fails, a restoration path (also termed backup path) is created via network elements NE5 and NE6 using restoration capacity PP1a, SPP, and PP1c. Conversely, if path WP2 fails, a restoration path is created using restoration capacity PP2a, SPP, and PP2c. It is important to understand, that these restoration paths, even if they may be pre-calculated, are only established after occurrence of a failure. In other words, the network elements NE5 and NE6 switch a corresponding internal crossconnection to establish the restoration path only after a failure has occurred. This allows to share a single entity of restoration capacity SPP between NE5 and NE6 for both working paths WP1 and WP2.

Figure 2:
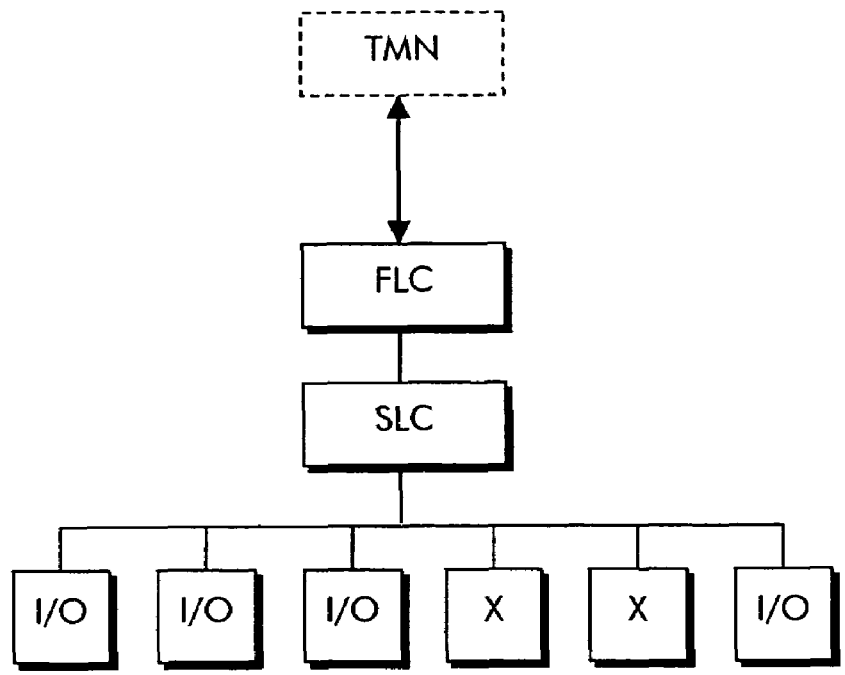
FIG. 2 shows the control and management of a network element.

The hardware design and control of a network element is shown schematically in FIG. 2. The network element itself consists of a number of hardware modules, such as input/output boards I/O and crossconnect matrix boards X shown in the embodiment by way of example. Interconnections and signal flow of transmission signals are not shown in the figure. The individual boards are controlled and configured by a low level hardware controller, which is called second level controller SLC. The second level controller can be distributed among the boards, can consist of some few shelf controllers, or can also be a single controller if the network element is installed in only one shelf. It contains the hardware oriented control software which is termed firmware. The second level controller is controlled by a higher level controller called the first level controller FLC. This first level controller contains for the purpose of network management an abstraction of the network element and its resources in the form of a management information base (MIB). The MIB contains managed objects respectively representing the physical and logical resources of the entire network element and their configuration. A virtual hardware module and a firmware adaptor interface the MIB in the first level controller towards the firmware in the second level controller.

The first level controller FLC is controlled by a network management or management plane TMN, which may be a central network management system for the entire network. The interface between the central network management system and the network elements is known as the Q-interface for which a standardized protocol exists. Alternatively, the management plane may be a distributed network management system where each network element is controlled by an individual element controller and where these element controllers communicate with each other using the recently defined GMPLS protocol to find a route through the network and establish network paths. Communication within the management plane and towards the network elements uses a dedicated packet switched control network apart from the transport network. However, some interconnections in this dedicated control network may use the so-called data communication channels in the section overhead of transmission signals in the transport network.

The management plane TMN is responsible to properly configure the entire network. If for example a new connection is to be established in the network, the management plane instructs the first level controllers of the affected network elements to switch the new connection. The first level controllers reconfigure their abstract view of the corresponding network elements accordingly and update their persistent configuration data. Then the request is forwarded to the second level controller, which determines the actual hardware modules involved and reconfigures these to establish the connection as requested.

In reverse direction, the second level controller monitors the hardware modules for any alarm and failure conditions and reports these to the first level controller. The first level controller maps alarm and failure reports on the abstraction and reports any irregularities to the management plane.

In known restoration mechanisms, the management plane needs to localize a failure by correlating received alarm reports and requests the affected network elements to switch new crossconnections to establish a dynamically calculated or pre-calculated restoration path. However, from the above explained, it would be evident, that this process requires extended time-consuming communication and processing, which sums up to a considerably high restoration time.

It is therefore a basic idea of the present invention to provide information about pre-calculated restoration paths at the lowest level, i.e., in the second level controller SLC or even with the hardware as such and to trigger switching of the local crossconnections necessary to establish a restoration path in the event of a failure with locally available information, only.

If no protocol communication between network elements and towards the management plane is necessary, restoration times can be shortened considerably. However, the affected network elements would not naturally know about a failure that happened somewhere else in the network. For example in FIG. 1, after a failure of working path WP1, network elements NE5 and NE6, which do not see the failed path at all, would have to initiate appropriate crossconnections to establish a protection path over PP1a, SPP, and PP1c.

Therefore, another basic idea is to mark traffic on path level with an identifier, which has unambiguous meaning at least locally and to monitor the interfaces of a network element for new traffic streams. If a new traffic stream is detected at an interface, this traffic stream will then automatically be crossconnected to the appropriate output port as defined by the locally available forwarding information provided in the form of a forwarding table.

Figure 3:
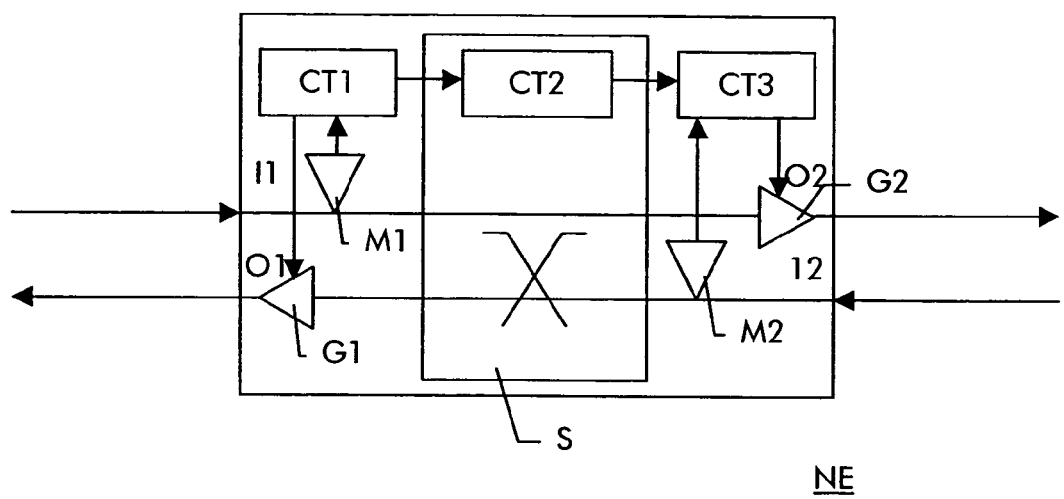
FIG. 3 shows the restoration principle at a network element in a first embodiment.

FIG. 3 shows a network element NE with a first input port I1 and first output port O1 and a second input port I2 and a second output port O2. It has to be noted that these two input and output ports are shown only be way of example but that the network element has in reality more than only two input and output ports. A crossconnect matrix S in the network element is provided between the input ports to allow crossconnections from any input port to any output port under the control of a matrix controller CT2. Such crossconnections are semi-permanent through-connections for individual multiplexing units that repeat periodically in the received multiplex signal. Crossconnections thus appear as transparent connections on path level.

Ports I1 and O1 are controlled by I/O controller CT1 and I2 and O2 are controlled by I/O controller CT3. Controllers CT1-CT3 form the second level controller of the network element. A first level controller is not shown in the figure since according to the invention, restoration paths are throughconnected without interaction of the first level controller and the superordinate management plane.

A monitor M1 is provided at the input I1, which monitors received traffic streams. In particular, the monitor checks the path tags of traffic streams in the received transmission signal, which is a multiplex signal. If a received path tag corresponds to the configured path tag, then everything is all right. If the monitor M1 detects a mismatch between a received tag and configured tag, then it raises a corresponding alarm towards the I/O controller CT1 and reports the received tag. This is particularly the case when a new traffic stream is received at the input port I1, for example due to a restoration action of the preceding network element. The I/O controller CT1 checks then a forwarding table stored in an memory of the controller to determine to which output port the newly received traffic stream shall be crossconnected and instructs the matrix controller M2 accordingly.

A pattern generator G1 is provided at the output port O1, which serves to generate an idle signal referred to as supervisory unequipped signal in currently unused time slots that represent the spare transmission capacity. A similar pattern generator G2 is also foreseen at output port O2.

Assume known that the network element NE corresponds to NE5 in FIG. 1 and that input I1 is connected to NE1 and output O2 is connected to NE6. Assume further that working path WP1 has failed. NE1 will recognize the interrupted transfer over working path WP1 and, according to the invention, will thus check its forwarding information (i.e., the forwarding table) to see whether there is a pre-calculated restoration path available for the failed traffic stream. According to its information, a restoration path via NE5 could be established. NE1 thus crossconnects the traffic stream from the failed working path WP1 to the spare resource PP1, which was previously unused. NE5 will not know that working path WP1 has failed but only receives at its input I1 a new traffic stream with a new path tag. It thus raises a mismatch alarm towards its I/O controller CT1 and reports the received path tag.

I/O controller CT1 will now check its forwarding table provided for this purpose to determine to which output port the newly received traffic stream shall be crossconnected. In the embodiment, this would be output port O2. Thus, CT1 instructs the matrix controller to crossconnect the input port I1 to the output port O2. Matrix controller CT2 then configures the crossconnect matrix S accordingly and informs the I/O controller CT3 of the new crossconnection. Controller CT3 re-configure the output port O2 to remove the supervisory unequipped mode SUG and let the traffic stream pass.

In the example shown in FIG. 1, the redirected traffic stream would thus already reach network element NE6, for which now the same procedure will apply. This continues until the redirected traffic stream reaches the destination network element NE2 and the protection path is thus established.

The involved network elements notify the network management plane of the restoration action, i.e., that and which restoration path has been established. In a preferred improvement of the invention, after the restoration path is established and some of the backup capacity thus used, the management plane determines new pre-calculated restoration paths from the remaining available backup resources and configures the network elements with new forwarding tables that contain the new restoration paths.

It should be noted that transmission signals are multiplex signals and carry more than one tributary signals. In the example chosen, the transmission signals are structured according to the SDH. This means, a transmission signal is a continuous bit stream subdivided into frames with a length of 125 µs, each. The frames are called synchronous transport modules STM-N (N=1, 4, 16, 64 or 256). Each STM-4 frame for example contains four higher order multiplex units VC-4, which in turn can contain either three lower order multiplex units VC-3, 21 lower order multiplex units VC-2 or 63 lower order multiplex units VC-12, each, or any suitable combinations thereof. Each multiplex unit represents a path through the network. The multiplex units carry the actual tributary signals and are repeated within each successive frame in exactly the same order. This is called the structure of the multiplex signal which is normally only changed by the management plane to establish new paths or change or delete existing paths. Idle multiplex positions within the payload section of a frame are filled with dummy multiplex units carrying the so-called supervisory unequipped signal.

In order to be able to properly process the received transmission signal and in order to check consistency of the bit stream received, each receive interface has to know exactly the structure of the multiplex signal, i.e., which and how many multiplex units are multiplexed into each frame. Though, when new paths are created and the structure of the multiplex signal is thus changed, the receive end interface has to be reconfigured to accept the new multiplex structure. If the received multiplex structure does not match with the configured multiplex structure, the receive interface raises a mismatch alarm, which normally means that there is something wrong in the network, e.g., because a human operator has accidentally mixed up some cables.

According to the present invention, a protection path is automatically established without prior reconfiguration of the receive side and the alarm thus provoked is used to trigger a table look-up to determine the destination of the multiplex units representing the new protection path. As explained above, this requires to identify the multiplex units, for which we see several alternatives that will be described in the following.

Trail Trace Identifier

Each multiplex unit has a path overhead that accompanies the tributary signal from ingress to egress of the transport network. This path overhead has a one byte field (referred to as J0 for lines, J1 for higher order virtual containers and J2 for lower order virtual containers) for an identifier known as the Trail Trace Identifier (TTI). The TTI is an identifier that can be freely assigned by the operator for the purpose to check locally whether the received multiplex unit corresponds to the expected one, i.e., whether the receive interface is properly connected with the right far-end transmit interface and all multiplex units appear in exactly the multiplex position within the received frames they should. This serves to prevent manual misconnections due to human configuration mistakes.

As the TTI serves to identify an entire path, it should not be changed along this path. Therefore, in order to use the TTI as path tag for the purpose of the invention, a unique and unambiguous assignment of TTIs within the entire network is necessary.

A TTI is 16 bytes long and is thus transmitted in 16 successive frames. Since the frames repeat every 125 μs, transmission of the entire TTI requires 2 ms. The first byte of the TTI contain a CRC7 checksum and of the subsequent bytes the most significant bit is reserved for frame alignment. Thus, 105 bits remain to identify a path signal. We propose the following assignment of the remaining 105 TTI bits (which differs to some extend from the already defined structure according to ITU-T G.7714.1, which at present does not allow for non-printable symbols): Each network node is assigned a unique address of 32 bits. The first 32 bits of the TTI define the destination address; 32 bits define the source address; 16 bits define a path id unique for the source address; 8 bits define a setup priority of that circuit used for preemption at setup time; and 8 bits define a restoration priority of that circuit used for preemption at restoration time.

If the input interface detects an unexpected multiplex unit in a received frame, it reports the received TTI to the second level controller. The second level controller looks up in his forwarding table whether a pre-calculated restoration path exists for this TTI and if so, to which output port and time slot the multiplex units is to be crossconnected. If there is a pre-calculated restoration path defined for the received TTI, the forwarding table will point to an idle (i.e., unequipped) timeslot of an appropriate output port. Then, the second level controller configures the crossconnect matrix accordingly and instructs the output port to remove the supervisory unequipped signal from the corresponding timeslot and insert the through-connected multiplex unit instead.

A failed path, i.e., WP1 in FIG. 1, is detected by an adjacent network element, i.e., NE1. NE1 now checks its forwarding table to find an alternative output interface and timeslot and switches a crossconnection (or a bridge) to this output and timeslot. In the embodiment, NE1 would bridge the traffic stream affected by the failure from WP1 to the reserved capacity PP1a. NE5 would detect the unexpected traffic stream and crossconnect it to the shared restoration capacity SPP. NE6 would equally detect the unexpected traffic stream and crossconnect it to restoration capacity PP1c towards NE2. NE2 in turn would detect the traffic stream that should normally arrive from WP1 at the input port terminating PP1c and crossconnects the traffic stream to the appropriate destination. In other words, the destination node N2 merges the restoration path with the failed working path. By this mechanism, a restoration path for WP1 is automatically established along PP1a, SPP, and PP1c.

As explained above, a complete TTI is transmitted every 2 ms. In order to be sure that an unexpected TTI is not only an artifact due to bit errors, three consequent TTIs should be received before a network element initiates the crossconnection. This would require about 6 ms in total at one network element. For an average path leading over five network elements, the total restoration time lies thus in the rage of only 30 ms.

Restoration time can even be shortened, if we take into account that a path through the network is typically bidirectional. Until know, only one direction has been considered. However, if the same procedure is applied in the reverse direction, the successive setup of the restoration path would start from both sides of a failed path and would thus meet somewhere in the middle of the restoration path. Therefore, the restoration time can be shortened by a factor of two.

The first alternative using the path TTI as path tag would thus lead to a very short restoration time but would require a unique assignment of addresses throughout the entire network. As the TTI is today used under the sole responsibility of the operator, this would impose some organizational compatibility problems in heterogeneous multi-national or multi-operator networks.

Thus a second alternative could be preferred over the first:

Tandem Connection Trail Trace Identifier

In the path overhead, a one byte field is reserved for a Tandem Connection Monitoring (TCM) function. This byte is referred to as N1 for higher order virtual containers and as N2 for lower order virtual containers. Bits 7 and 8 of this field contain in a 76 multiframe a tandem connection trail trace identifier (TC-TTI). This TC-TTI could be used for the path tag in a similar manner as described above for the path TTI, i.e., to transmit a 32 bit destination address, a 32 bit source address; 16 bits for a path id unique for the source address; 8 bits for a setup priority of that circuit used for preemption at setup time; and 8 bits for a restoration priority of that circuit used for preemption at restoration time.

The use of TCM function has several advantages. First of all, TCM function can preferably be used to detect and communicate failure locations along a working path. Moreover, a tandem connection is created under the sole responsibility of a single operator. He is solely responsible for the use of the TC-TTI and can choose whatever address assignment he wants. This avoids compatibility problems and conflicts in the assignment of TTIs.

On the other hand, as the TC-TTI is transmitted in a 76 multiframe, i.e., an entire TTI is transmitted every 76 frames a 125 μs, reception of one TTI requires 9,5 ms. Two or three consequent TC-TTI frames would thus require about 20 or 30 ms, respectively, for detection, i.e., until the TTI can be considered to be stable. Even when restoration starts from both sides of a failed path, a restoration path along at most four network elements can be established within an average restoration time of 50 ms.

Therefore, a third alternative is preferred over the first two:

Use of the Reserved K3 Byte

In the path overhead, one byte is reserved for an automatic protection switching (APS) protocol on path level. This byte is referred to a K3, an in particular bits 1 to 4 thereof, at higher order VC level and K4, and in particular bits 3 and 4 thereof, at lower order VC level. However, APS signaling for protection switching on path level has never gained much acceptance and is currently not used in the field. Therefore and because protection mechanisms on path level would become obsolete with the use of the present invention, we propose to re-use the existing K3 or K4 byte positions for a local identifier. Alternatively, the reserved bits 5 and 6 of K3 or bits 5 to 7 of K4 could be used instead.

As these few bits would certainly not suffice for a worldwide or at least network wide unique and unambiguous address space, the third embodiment uses an identifier which has local meaning, only. In other words, the identifier, which we will call in this case a label, is unique only for a certain physical link and corresponding interface and will be changed on each link along the path.

In particular, each interface has its own forwarding table. The table contains for received labels corresponding output ports and timeslots where the multiplex unit is to be crossconnected and a new label with which the existing label is to be replaced. This new label is the one required by the subsequent network element. As those skilled in the art would appreciate, this is to some extent similar to the known label switching (MPLS) but not used for routing packets but for crossconnecting multiplex units between continuous bit stream multiplex signals. We can therefore term this process "label crossconnecting".

This has the advantage that, since the K3 or K4 byte is repeated once every frame, after reception of only three consequent frames the new label can be considered as stable and a corresponding crossconnection initiated, which would therefore take less than 1 μs per network element (i.e., per hop), only. The label can also use some selected bits (e.g., bits 3 and 4 of K4) of few successive frames thus building a "K4 multiframe" and would still meet any time requirements for restoration.

Failure Detection

As according to the invention, a pre-calculated restoration path is established in the case of a failure occurring somewhere along a working path, it is necessary to detect the failure situation. On path level, the path terminating network elements will immediately receive an AIS (alarm indication signal), which expresses that the path has failed. Thus, the terminating network elements can activate restoration.

However, it is not necessarily true that the path is terminated within the transport network but can also be terminated at interfacing telecommunications equipment outside the transport network, for example at an IP router using the transport network for a backbone connection. As mentioned earlier, failure detection may preferably be achieved using Tandem Connection Monitoring (TCM) as described for example in ITU-T G.707. A Tandem Connection can be established along an arbitrary segment of a path under the sole control of one network operator. This would allow to detect any failure condition that might occur along this monitored segment and initiate restoration starting from the termination points of the Tandem Connection, rather than from the termination points of the entire path. The use of TCM would also make sure that unidirectional failures are reported in reverse direction so as to enable restoration actions by a preceding network element.

In another advantageous improvement, use can be made of non-intrusive intermediate Tandem Connection monitors, and temporary Tandem Connection sources created along the path segment in the case of a failure in order to forward information about the actual fault location.

In particular, a failure adjacent network element detects the failure and activates a temporary tandem connection source function. This function creates a valid tandem connection signal replacing the failed signal and inserts therein a failed link identifier corresponding to the failed link. More details on fault localization using Tandem Connection Monitoring can be found in co-pending European Patent Application "Failure Localization in a Transmission Network", filed 19 Nov. 2002 and being assigned the European filing number 02360317.8, which document is incorporated by reference herein.

This would allow that any network element along the failed path is informed about the actual failure location and restoration actions can be started not only from the terminal points of the Tandem Connection but already from any network element in-between the failure location and the terminal point. Thus, it would be possible to find in shorter time a shorter restoration path circumventing only the failure location but using most of the already existing and non-failed working path. As this would encompass the least amount of reconfiguration, this would again considerably reduce the time required for restoration and would also save spare resources as non-failed path segments would not have to be circumvented using spare resources.

Yet another alternative is to initiate restoration actions based on primary link alarms, i.e. loss of signal (LOS). This would however not cover all possible failures, but the most frequent failure sources which are for example a cable break or an optical fiber accidentally unplugged by a human operator.

Failed Connection Attempts

In a preferred improvement of the invention, a Tandem Connection is created along the restoration path so as to enable failure monitoring on the restoration path and allows backward transmission of a reverse defect indication in the case a connection attempt fails.

The restoration based on path tags and local forwarding information uses pre-calculated backup paths. However, it might occur that the local forwarding information is no longer up to date and the backup capacity already busy or that the backup capacity is for other reasons not available. In this case, the local restoration action will fail. This failure to establish the pre-configured restoration path will be reported as RDI (Reverse Defect Indication) in the Tandem Connection created on the restoration path. Moreover, the traffic stream from the failed restoration path will be routed in reverse direction back to the preceding network element, which will detect the tag and therefore know that connection setup of the restoration path has failed. (The latter measure works even without a TC created along the restoration path.)

Figure 4:
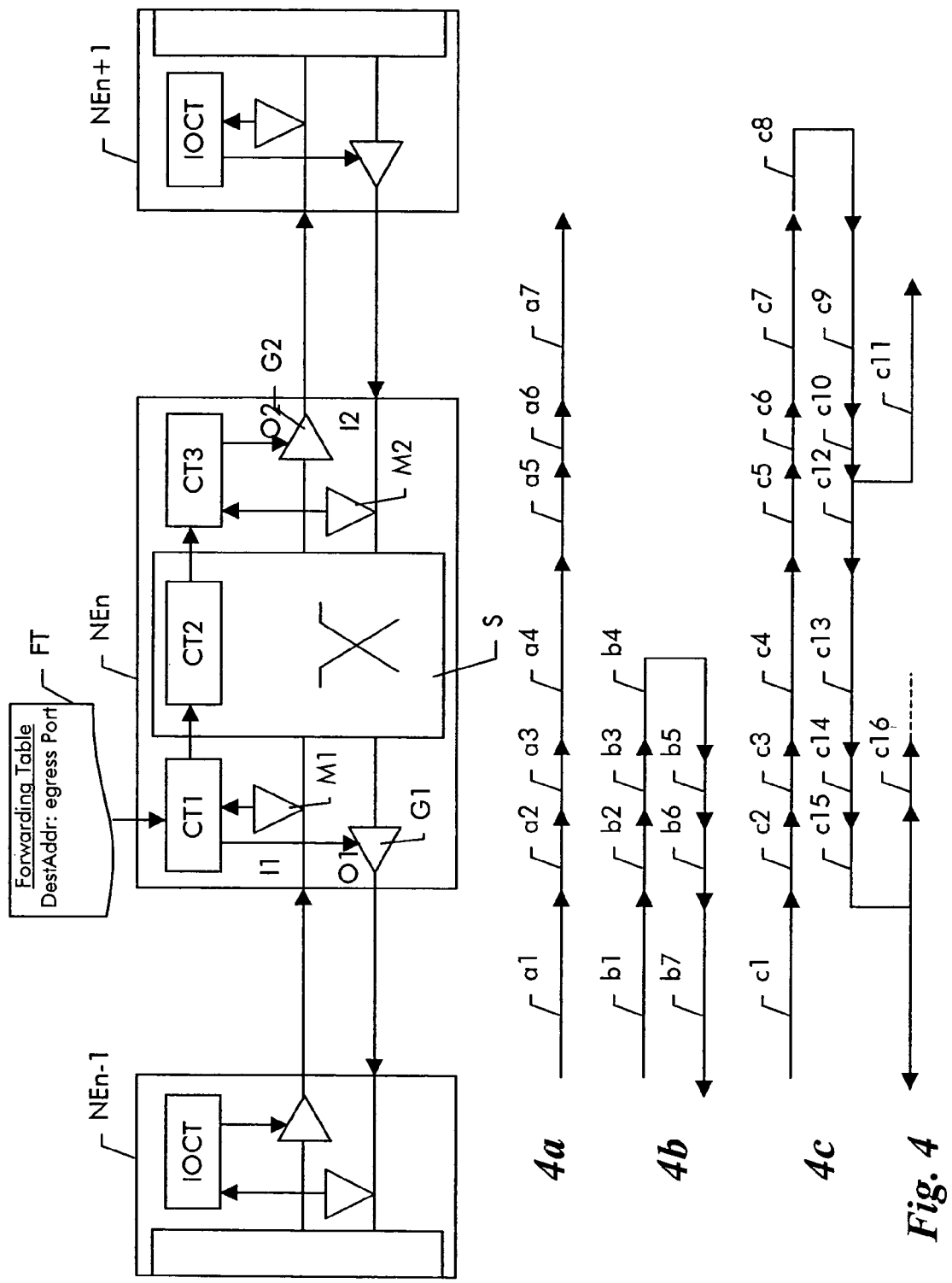
FIG. 4 shows how the path is established through a network element and what when path setup fails.

FIG. 4 shows schematically the connection setup according to the invention. A network element NEn is connected at the left side (upstream direction) to a network element NEn−1 and at the right side (downstream direction) to a network element NEn+1. Network element NEn corresponds to NE in FIG. 3. Three scenarios are depicted in the below FIG. 4a-4c. FIG. 4a symbolizes the successful connection setup; FIG. 4b shows that connection setup fails due to a contention in the switching matrix S; and FIG. 4c shows backward report in the case that connection setup fails at network element NEn+1.

In FIG. 4a, it is assumed that NEn−1 detect a failure of a working path and initiates setup of a restoration path. Therefore, it transmits at its output interface a new multiplex unit with a new path tag (TTI, TC-TTI, or K3/K4) to network element NEn. This is depicted as step a1. Monitor M1 detects in step a2 the new path tag and reports this to its I/O controller CT1. Depicted as step a3, CT1 looks up in a forwarding table FT the output port that corresponds to the destination address specified in the new path tag and informs the crossconnect matrix controller CT2 of the crossconnection to be switched. In step a4, the matrix controller CT2 configures the crossconnect matrix S accordingly and the new multiplex unit is crossconnect to output port O2. In the case of label switching, the output port O2 is configured via I/O controller CT3 to insert the new path label for the subsequent network element NEn+1. Anyway, output O2 is configured in step a5 to transmit the new multiplex unit and pattern generator G2 is deactivated so that the supervisory unequipped signal (SUG) is no longer inserted into the timeslot corresponding to the spare capacity.

Thus, the new multiplex unit with the new path tag reaches network element NEn+1, where the same procedure will apply.

In FIG. 4b, steps b1-b3 are the same as steps a1-a3 in FIG. 4a, but now the crossconnection at matrix S fails because the spare capacity at the output O2 is already used and the requested matrix connection thus blocked. Therefore matrix controller CT2 reconfigures the matrix S to loop the multiplexing unit back to output O1 in step b4. In step b5, I/O controller CT1 is informed about the failed connection setup and reconfigures the interface accordingly. Thus, in step b6, pattern generator G1 is deactivated so that the SUG signal is no longer transmitted in the corresponding spare timeslot at O1 and a reverse defect indication (RDI) is inserted into the associated path overhead. The new multiplex units with RDI inserted thus returns in step b7 to the previous network element NEn−1, which is will now know about the failed restoration attempt.

FIG. 4c shows a scenario where connection setup fails at network element NEn+1. Steps c1-c7 correspond to steps a1-a7 in FIG. 4a. In step c8, the crossconnection attempt in NEn+1 fails and the traffic signal is thus returned as in step b4-b6 in FIG. 4b. The multiplex units of the returned traffic signal are thus received in step c9 at input port 12 which detects in step c10 the TCM alarm (RDI) and the returned path tag and reports this to its I/O controller CT3. In step c11, the pattern generator G2 at output O2 is activated again to send SUG in the corresponding restoration timeslot that was used in step c7 before for the new traffic signal. In step c12, the matrix controller is informed to configure a crossconnection to the output port O1 and in step c13, the multiplex units are crossconnected through matrix S to O1. In step c14, I/O controller CT1 is informed of the failed connection setup and checks its forwarding table for an alternate restoration path. In step c15, controller CT1 has determined a secondary restoration path to be used instead of the failed one and starts in step c16 a new restoration action continuing after step a3 or c3.

Alternative failure reporting mechanisms include beside the looping back method described above the insertion of an RDI indicating that the link cannot be used or in the case of K3/K4 tap type, insertion of a corresponding reserved failure type.

Although having described several preferred embodiments of the invention, those skilled in the art would appreciate that various changes, alterations, and substitutions can be made without departing from the spirit and concepts of the present invention.

The inventive concept for a connection set-up based on path tags and local forwarding information can for example rather than for restoration purpose also be used for other purposes such as for distributed connection set-up without evolving the network management plane. This would lead to a connection setup that is to some extend similar to classical label switching or IP routing in packet networks. This would additionally require some sort of loop prevention mechanism, which could for example be achieved by properly defining the forwarding information and avoiding to overwrite a crossconnection for a bit-stream the same path tag.

What is claimed is:

1. A method of establishing a path through a transport network, said network comprising a number of physically interconnected network elements (NEn−1, NEn, NEn−1); transmission signals being transported over physical connections between said network elements; each transmission signal being subdivided into frames of the same length, said frames being structured according to a multiplex hierarchy into multiplex units respectively representing paths through said network and repeating every frame thereby forming traffic streams multiplexed to form said transmission signals; said method comprising the steps of:

assigning each traffic stream an identifier called hereinafter a path tag which is sent in said traffic stream on a regular basis;

providing forwarding information (FT) in each network element along said path to be established;

receiving (a1) a new traffic stream at an input port (I1) of a network element (NEn);

checking (a2) the path tag of the received traffic stream and determining (a3) an appropriate output port (O2) based on said path tag and the forwarding information (FT); and establishing (a4) an internal cross-connection between said input port (I1) and said previously determined output port (O2), wherein the assigning each traffic stream the path tag includes assigning a multiplex unit in a corresponding traffic stream the path tag to be sent in the traffic stream with the multiplex unit, each multiplex unit represents the corresponding traffic stream such that a sequence of identical multiplex units transmitted along a same path form the corresponding traffic stream.

2. A method for establishing a restoration path according to claim 1, comprising the steps of detecting a failure of an already existing path at a first network element (NE1);

at said first network element, crossconnecting the traffic stream affected by said failure to an alternate output port;

at an input port of a second network element (NE5), connected to the alternate output port of the first network element (NE1), receiving said traffic stream;

checking the path tag of the received traffic stream and determining an appropriate output port based on said path tag and the forwarding information of said second network element;

establishing an internal cross-connection between said input port and said previously determined output port; and repeating said steps at preceding network elements along said restoration path.

3. A method of establishing a path through a transport network, said network comprising a number of physically interconnected network elements; transmission signals being transported over physical connections between said network elements; each transmission signal being subdivided into frames of the same length, said frames being structured according to a multiplex hierarchy into multiplex units respectively representing paths through said network and repeating every frame thereby forming traffic streams multiplexed to form said transmission signals; said method comprising the steps of:

assigning each traffic stream an identifier called hereinafter a path tag which is sent in said traffic stream on a regular basis;

providing forwarding information in each network element along said path to be established;

receiving a new traffic stream at an input port of a network element;

checking the path tag of the received traffic stream and determining an appropriate output port based on said path tag and the forwarding information; and establishing an internal cross-connection between said input port and said previously determined output port, wherein said path tag is a trail trace identifier unambiguously assigned in said transport network.

4. A method according to claim 3, wherein said trail trace identifier is either a path trail trace identifier or a Tandem Connection trail trace identifier.

5. A method according to claim 1, wherein said path tag is a label which is inserted by the network element and which label will be replaced by the actual network element with a new label for the subsequent network element.

6. A network element (NEn) of a transport network; said network element comprising
at least one input port (I1) designed for the reception of a transmission signal subdivided into frames of the same length, said frames being structured according to a multiplex hierarchy into multiplex units respectively representing paths through said network and repeating every frame thereby forming traffic streams multiplexed to form said transmission signals;
wherein each traffic stream having an identifier assigned, which is called hereinafter a path tag and which is sent in said traffic stream on a regular basis;
a low-level controller (CT1, CT2, CT3; SLC) controlling said input port (I1) and comprising a memory for storing forwarding information (FT) provided to said network element;
a monitor (M1) assigned to said input port (I1) for checking the path tags of all traffic streams received at said input port and for determining whether any of said received path tags does not correspond to expected path tags and if so, for notifying the unexpected path tag to said low-level controller (CT1); and
a crossconnect matrix (S) for crossconnecting any of said traffic streams from said input port (I1) to any of a number of output ports (O2) under the control of said low-level controller (CT2); wherein said low level controller (CT1, CT2, CT3) is adapted to determine an appropriate output port (O2) for a traffic stream with an unexpected path tag based on said path tag and said forwarding information (FT) and to configure said crossconnect matrix (S) to establish an internal cross-connection between said input port (I1) and said previously determined output port (O2).

7. A network element according to claim 6, further comprising a high-level controller (FLC) connected to said low level-controller (SLC), said high level controller comprising an abstraction of physical and logical resources of said network element for the purpose of network management and an interface to a network management facility (TMN);
whereby said low-level controller (SLC) is adapted to determining an appropriate output port for a traffic stream with an unexpected path tag without involving said high-level controller (FLC).

8. A network element according to claim 6, wherein said low-level controller (SLC) is distributed among more than one shelves or on-board controllers in said network element.

9. A network management facility for controlling and configuring network elements of a transport network wherein transmission signals are transported over physical connections between said network elements; each transmission signal being subdivided into frames of the same length, said frames being structured according to a multiplex hierarchy into multiplex units respectively representing paths through said network and repeating every frame thereby forming traffic streams multiplexed to form said transmission signals; wherein each traffic stream is assigned an identifier called hereinafter a path tag; said network management facility being adapted and programmed to determine pre-calculated restoration paths for working paths being established in said network and to provide to said network elements forwarding information based on said path tags to allow said network elements to determine an appropriate output port for a traffic stream with an unexpected path tag received at an input port by using said path tag and said forwarding information and to establish an internal cross-connection between said input port and said previously determined output port.

10. A network management facility according to claim 9, being further adapted and programmed
to determine new restoration paths from remaining spare capacity in said network after receipt of a notification from a network element saying that a restoration path has been established and
to provide new forwarding information to said network elements.

11. A method of establishing a path through a transport network, said network comprising a number of physically interconnected network elements; transmission signals being transported over physical connections between said network elements; each transmission signal being subdivided into frames of the same length, said frames being structured according to a multiplex hierarchy into multiplex units respectively representing paths through said network and repeating every frame thereby forming traffic streams multiplexed to form said transmission signals; said method comprising the steps of:
assigning each traffic stream an identifier called hereinafter a path tag which is sent in said traffic stream on a regular basis;
providing forwarding information in each network element along said path to be established;
receiving a new traffic stream at an input port of a network element;
checking the path tag of the received traffic stream and determining an appropriate output port based on said path tag and the forwarding information; and
establishing an internal cross-connection between said input port and said previously determined output port,
wherein checking the path tag of the received traffic stream includes monitoring for a mismatch between a received path tag and a configured path tag and determining the appropriate output port according thereto.

12. A method according to claim 11, wherein the mismatch triggers a table look-up in a forwarding table, and a re-routing.

13. A network management facility according to claim 10, wherein the new restoration paths are dynamically determined as the remaining spare capacity changes.

14. A method according to claim 1, wherein the path tag of the corresponding traffic stream is part of a plurality of multiplex units that represent the corresponding traffic stream.

15. A method according to claim 1, wherein the establishing the internal cross-connection is a self-routing mechanism.

16. A method according to claim 1, wherein said multiplex units are virtual containers and each multiplex unit represents a path through said network and repeats every frame.

17. A method according to claim 16, wherein said traffic stream is a sequence of a plurality of identical multiplex units and transports a tributary signal.

18. A method according to claim 16, wherein said multiplex units carry tributary signals and are repeated within each successive frame in a same order.

19. A method according to claim 1, wherein said path tag is unique for a specific physical link between two adjacent network elements, and said path tag is changed for each physical link along said path.

20. A method according to claim 1, wherein said units are outside a payload and are visible to a transport layer.

21. A method according to claim 14, wherein said plurality of multiplex units are virtual containers and each multiplex unit of the plurality of multiplex units represents a path through said network and repeats every frame.

22. A method according to claim 5, wherein said path tag is assigned within said traffic stream and is dynamically changed during a transmission of said traffic stream by said actual network element.

23. A method according to claim 15, wherein each network element of said number of network elements performs a self-routing process by establishing said internal cross-connection independently from a previous network element.

24. A method according to claim 1, wherein objects within a payload section of each multiplex unit are not assigned the path tag.

* * * * *

UNITED STATES PATENT AND TRADEMARK OFFICE
CERTIFICATE OF CORRECTION

PATENT NO.     : 7,590,131 B2
APPLICATION NO. : 10/787358
DATED          : September 15, 2009
INVENTOR(S)    : Ansorge et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1573 days.

Signed and Sealed this

Twenty-first Day of September, 2010

David J. Kappos
*Director of the United States Patent and Trademark Office*